US012285914B2

United States Patent
Torrealba et al.

(10) Patent No.: US 12,285,914 B2
(45) Date of Patent: *Apr. 29, 2025

(54) TECHNIQUES FOR INTEGRATED PREHEATING AND COATING OF POWDER MATERIAL IN ADDITIVE FABRICATION AND RELATED SYSTEMS AND METHODS

(71) Applicant: Formlabs, Inc., Somerville, MA (US)

(72) Inventors: Eduardo Torrealba, Cambridge, MA (US); Steven Thomas, Cambridge, MA (US); Christopher Auld, Boston, MA (US)

(73) Assignee: Formlabs, Inc., Somerville, MA (US)

( * ) Notice: Subject to any disclaimer, the term of this patent is extended or adjusted under 35 U.S.C. 154(b) by 500 days.

This patent is subject to a terminal disclaimer.

(21) Appl. No.: 17/402,914

(22) Filed: Aug. 16, 2021

(65) Prior Publication Data

US 2021/0370601 A1     Dec. 2, 2021

Related U.S. Application Data

(63) Continuation of application No. 16/163,391, filed on Oct. 17, 2018, now Pat. No. 11,117,324.
(Continued)

(51) Int. Cl.
    *B29C 64/295*      (2017.01)
    *B22F 12/13*      (2021.01)
    (Continued)

(52) U.S. Cl.
    CPC ............ *B29C 64/295* (2017.08); *B22F 12/13* (2021.01); *B29C 35/02* (2013.01); *B29C 64/153* (2017.08); *B29C 64/205* (2017.08); *B29C 64/218* (2017.08); *B29C 64/393* (2017.08); *B33Y 10/00* (2014.12); *B33Y 30/00* (2014.12);
    (Continued)

(58) Field of Classification Search
CPC ... B29C 64/295; B29C 64/153; B29C 64/393; B29C 64/218; B29C 35/02; B33Y 30/00
See application file for complete search history.

(56) References Cited

U.S. PATENT DOCUMENTS

| 4,863,538 A | 9/1989 | Deckard |
| 11,117,324 B2 | 9/2021 | Torrealba et al. |

(Continued)

OTHER PUBLICATIONS

International Search Report and Written Opinion for International Application No. PCT/US18/56278 mailed Dec. 12, 2018.

*Primary Examiner* — Larry W Thrower
(74) *Attorney, Agent, or Firm* — Michael J. Attisha; Greenberg Traurig, LLP

(57) ABSTRACT

Techniques for improved efficiency of sintering in additive fabrication are described. According to some aspects, mechanisms for depositing and leveling source material are combined with a mechanism for heating the material. In some embodiments, one or more heating elements may be arranged to lead and/or follow a material deposition mechanism such that heat may be applied to the build region in concert with deposition of material. As a result of this technique, the heating and depositing steps may be performed closer together in time and/or heat may be applied more directly to the material than in conventional systems. As a result, greater control over material temperature may be achieved, thereby avoiding excess temperature exposure and subsequent undesirable changes to the material.

6 Claims, 9 Drawing Sheets

Related U.S. Application Data

(60) Provisional application No. 62/575,024, filed on Oct. 20, 2017.

(51) Int. Cl.
  *B29C 35/02*    (2006.01)
  *B29C 64/153*   (2017.01)
  *B29C 64/205*   (2017.01)
  *B29C 64/218*   (2017.01)
  *B29C 64/393*   (2017.01)
  *B33Y 10/00*    (2015.01)
  *B33Y 30/00*    (2015.01)
  *B33Y 40/00*    (2020.01)
  *B33Y 50/02*    (2015.01)
  *B22F 10/22*    (2021.01)
  *B22F 10/28*    (2021.01)
  *B22F 10/47*    (2021.01)
  *B22F 10/73*    (2021.01)
  *B22F 12/49*    (2021.01)
  *B22F 12/52*    (2021.01)
  *B22F 12/55*    (2021.01)
  *B22F 12/63*    (2021.01)
  *B22F 12/67*    (2021.01)

(52) U.S. Cl.
  CPC ............... *B33Y 40/00* (2014.12); *B33Y 50/02* (2014.12); *B22F 10/22* (2021.01); *B22F 10/28* (2021.01); *B22F 10/47* (2021.01); *B22F 10/73* (2021.01); *B22F 12/49* (2021.01); *B22F 12/52* (2021.01); *B22F 12/55* (2021.01); *B22F 12/63* (2021.01); *B22F 12/67* (2021.01); *B29C 2035/0283* (2013.01)

(56) References Cited

U.S. PATENT DOCUMENTS

| | | |
|---|---|---|
| 2002/0090313 A1 | 7/2002 | Wang et al. |
| 2007/0145629 A1 | 6/2007 | Ebert et al. |
| 2008/0111271 A1 | 5/2008 | Khoshnevis |
| 2008/0257879 A1 | 10/2008 | Huskamp |
| 2014/0263209 A1 | 9/2014 | Burris et al. |
| 2016/0329529 A1 | 11/2016 | Xiao |
| 2017/0008234 A1 | 1/2017 | Cullen et al. |
| 2019/0118472 A1 | 4/2019 | Torrealba et al. |

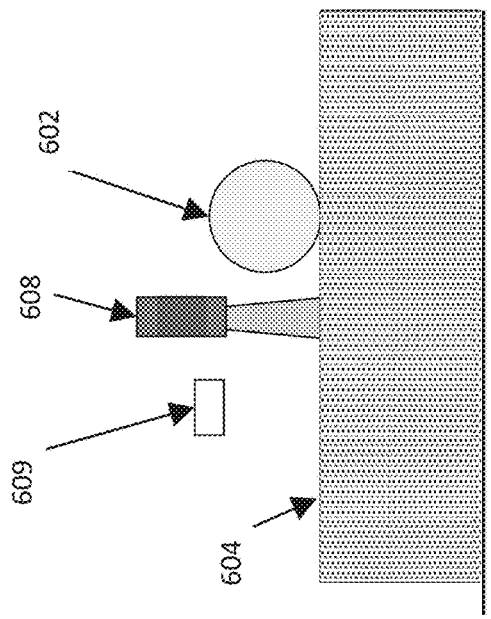
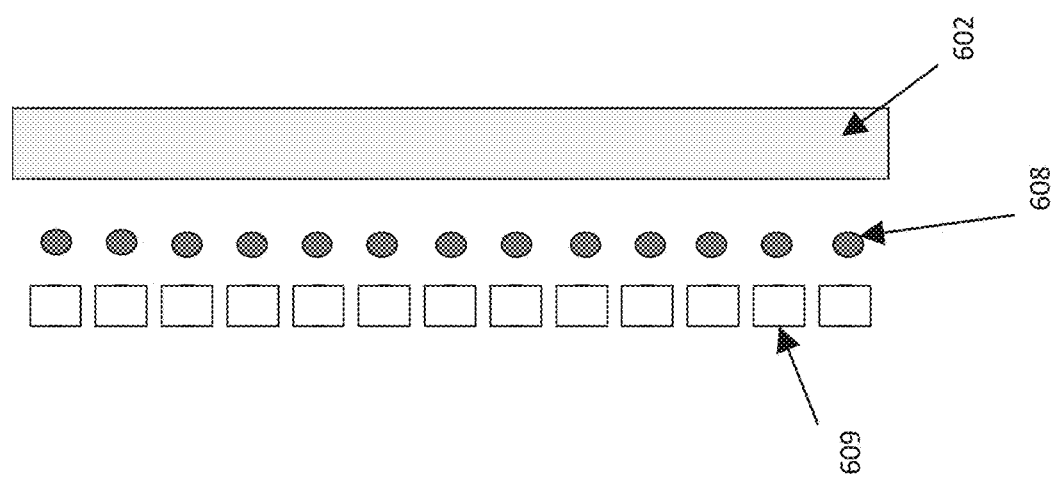
FIG. 6B
FIG. 6A

TECHNIQUES FOR INTEGRATED PREHEATING AND COATING OF POWDER MATERIAL IN ADDITIVE FABRICATION AND RELATED SYSTEMS AND METHODS

CROSS-REFERENCE TO RELATED APPLICATIONS

The present application claims the benefit as a continuation under 35 U.S.C. § 120 of U.S. application Ser. No. 16/163,391, filed Oct. 17, 2018, which claims the benefit under 35 U.S.C. § 119(e) of U.S. Provisional Patent Application No. 62/575,024, filed Oct. 20, 2017, each of which is hereby incorporated by reference in its entirety.

BACKGROUND

Additive fabrication, e.g., 3-dimensional (3D) printing, provides techniques for fabricating objects (also referred to as "parts") by causing portions of a building material to solidify at specific locations. Additive fabrication techniques may include stereolithography, selective or fused deposition modeling, direct composite manufacturing, laminated object manufacturing, selective phase area deposition, multi-phase jet solidification, ballistic particle manufacturing, particle deposition, selective laser sintering or combinations thereof. Many additive fabrication techniques build parts by forming successive layers, which are typically cross-sections of the desired object. Typically each layer is formed such that it adheres to either a previously formed layer or a substrate upon which the object is built.

In one approach to additive fabrication, known as selective laser sintering, or "SLS," solid objects are created by successively forming thin layers by selectively fusing together powdered material. One illustrative description of selective laser sintering may be found in U.S. Pat. No. 4,863,538, incorporated herein in its entirety by reference.

SUMMARY

According to some aspects, an additive fabrication device configured to produce three-dimensional objects by sintering a source material is provided, the device comprising a material deposition mechanism, a fabrication bed configured to receive source material from the material deposition mechanism, a heater configured to move over the fabrication bed and to direct heat onto the source material deposited by the material deposition mechanism, and an energy source configured to be directed onto the deposited source material heated by the heater to cause sintering of the heated deposited source material.

According to some aspects, a method of fabricating an object via additive fabrication is provided, said additive fabrication comprising sintering a source material, the method comprising moving a material deposition mechanism over a fabrication bed and operating the material deposition mechanism to deposit source material onto the fabrication bed, directing heat from the heater onto the source material deposited by the material deposition mechanism by moving a heater over the fabrication bed, and sintering the heated deposited source material by directing an energy source onto the deposited source material heated by the heater.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

FIG. 6A-B depict two different views of an assembly that combines infrared sensors with a heating array, according to some embodiments;

DETAILED DESCRIPTION

Figure 1:
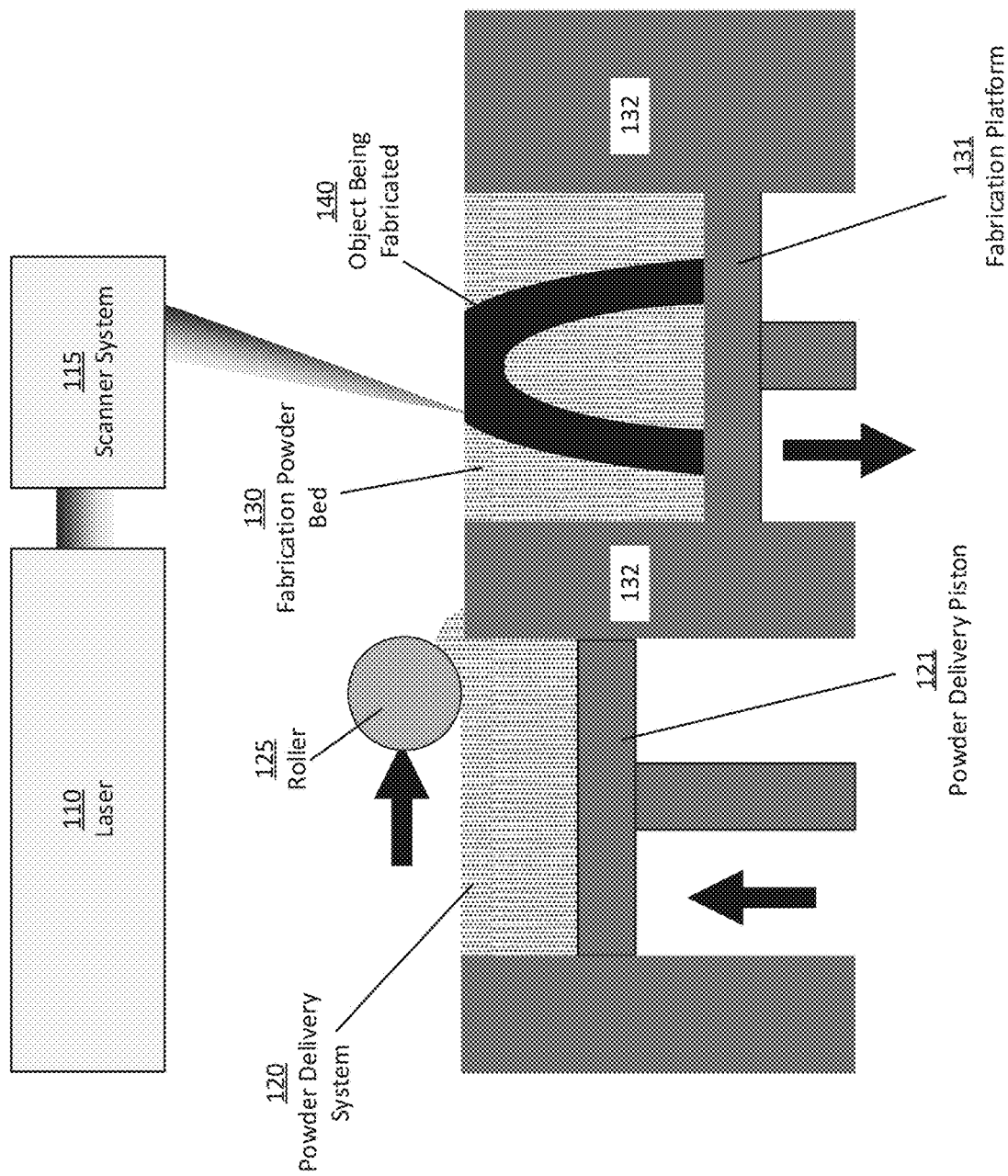
FIG. 1 depicts an illustrative selective laser sintering device, according to some embodiments.

Some additive fabrication techniques, such as Selective Laser Sintering (SLS), form parts by fusing source material, such as one or more fine powders, together into larger solid masses. This process of fusing a source material is referred to herein as "consolidation," and typically occurs by directing sufficient energy (e.g., heat and/or light) to the material to cause consolidation. Some energy sources, such as lasers, allow for direct targeting of energy into a small area or volume. Other energy sources, such as heat beds or heat lamps, direct energy into a comparatively broader area or volume of material. Since consolidation of source material typically occurs at or above a critical temperature, producing parts as intended requires effective management of temperature within the source material.

In order to form a part via sintering techniques from a plurality of layers, a layer of unconsolidated material is deposited onto a fabrication bed and then heated in desired locations to consolidate regions of the layer. An additional layer of unconsolidated material is then deposited onto the fabrication bed over the first layer and further regions consolidated, and so forth until the part is formed.

In some additive fabrication systems, the unconsolidated source material is preheated to a temperature that is sufficiently high so as to require minimal additional energy exposure to trigger consolidation. For instance, some conventional systems utilize radiating heating elements that aim to consistently and uniformly heat both the uppermost layer and the volume of the material to a temperature below, but close to, the critical temperature for consolidation. A laser beam or other energy source directed at the material may then provide sufficient energy to reach the critical temperature and thereby cause consolidation. However, maintaining an elevated temperature in this manner prior to consolidation, sometimes referred to as "preheating," poses numerous technical challenges.

Consistency of the temperature of preheated unconsolidated material may be critical to the successful fabrication of parts using the selective sintering process. In particular, the system should preferably maintain the temperature of the preheated unconsolidated material at as close to a constant temperature as feasible so that the total amount of energy actually delivered to an area of unconsolidated material can be predicted for a given energy exposure amount. Additionally, when consolidating the material, the system should preferably maintain the temperature of the material at or above its consolidation temperature for a sufficient time for the consolidation process to complete. Moreover, underheating of the material during fabrication may result in a failure of the material to consolidate and/or may result in inferior material properties within the fabricated part. As a result of these factors, consistent and even preheating of the unconsolidated material is highly desirable.

While conventional systems may employ numerous heating techniques, such as radiative or convective heating methods, such systems generally deposit unconsolidated material in a build region then wait for the unconsolidated material to be heated to an even temperature before performing consolidation. These heating techniques can significantly increase the amount of time needed to fabricate a part, since a waiting period must be performed prior to forming each layer of the part. Some conventional systems attempt to reduce this waiting period by heating the unconsolidated material prior to its deposition into the build region, but this may have the undesirable effect of degrading the unconsolidated material by exposing it to high temperatures for an extended period of time. Additionally, excessive heating of the material prior to deposition can lead to diminished flow characteristics which may cause the bed to tear or reduce the smoothness of coating as the material is deposited.

The inventors have recognized and appreciated that efficiency of a sintering additive fabrication process may be increased by combining a mechanism for depositing and leveling unconsolidated material with a mechanism for heating the unconsolidated material. In particular, one or more heating elements may be arranged to lead and/or follow a material deposition mechanism such that heat may be applied to the build region in concert with deposition of material. As a result of this technique, the heating and depositing steps may be performed closer together in time and/or heat may be applied more directly to the material than in conventional systems. As a result, greater control over material temperature may be achieved, thereby avoiding excess temperature exposure and subsequent undesirable changes to the material.

According to some embodiments, a heating element and a material deposition mechanism may be arranged in an additive fabrication device so that both can be moved simultaneously over a fabrication bed. The heating element may be arranged to pass over areas of the fabrication bed at the same time, or shortly after, the material deposition mechanism passes over the same areas. In some embodiments, the heating element and material deposition mechanism may be mechanically coupled together (e.g., attached to a common assembly). In some embodiments, the heating element and material deposition mechanism may be separately mounted and operated but configured to move such that the heating element leads or follows the material deposition mechanism.

According to some embodiments, a heating element may be operated in a closed loop feedback mode such that an amount of heating produced is selected based on sensing the temperature of one or more regions of the build region. In some embodiments, such sensing may be accomplished via thermal imaging and/or other non-contact thermal sensing means of the fabrication bed.

The herein-described techniques for combining a mechanism for depositing and leveling unconsolidated material with a mechanism for heating the unconsolidated material may, as discussed above, result in a sintering additive fabrication process with greater efficiency. Nonetheless, the inventors have additionally recognized and appreciated techniques for further increasing efficiency by combining the heating and deposition mechanisms with a mechanism for consolidating material. In particular, unconsolidated preheated material may be consolidated by an energy source that is arranged to follow the material deposition and heating mechanisms and that is configured to direct energy to desired areas of the material. For instance, newly deposited and preheated material may be consolidated by a laser while the material deposition and heating mechanisms continue to move and prepare material in other areas of the fabrication bed.

In some embodiments, combined mechanisms for deposition, heating and consolidation may be arranged to rotate such that these mechanisms move continuously (or moved continuously except for a period in which the fabrication bed is lowered). For instance, the mechanisms may rotate around an axis such that they may be continuously moved in the same direction (in contrast to moving from one end of a fabrication bed to another, at which point the mechanisms must stop before reversing direction). As a result, even greater efficiency of a sintering additive fabrication device may be achieved by forming consolidated material continuously, or continuously except for a period in which the fabrication bed is lowered.

Following below are more detailed descriptions of various concepts related to, and embodiments of, techniques for combining mechanisms for depositing and preheating unconsolidated material in sintering additive fabrication techniques. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

An illustrative conventional selective laser sintering (SLS) additive fabrication device is illustrated in FIG. 1. In the example of FIG. 1, SLS device 100 comprises a laser 110 paired with a computer-controlled scanner system 115 disposed to operatively aim the laser 110 at the fabrication bed 130 and move over the area corresponding to a given cross-sectional area of a computer aided design (CAD) model representing a desired part. Suitable scanning systems may include one or more mechanical gantries, linear scanning devices using polygonal mirrors, and/or galvanometer-based scanning devices.

In the example of FIG. 1, the material in the fabrication bed 130 is selectively heated by the laser in a manner that causes the powder material particles to fuse (sometimes also referred to as "sintering" or "consolidating") such that a new layer of the object 140 is formed. SLS is suitable for use with many different powdered materials, including any of various forms of powdered nylon. In some cases, areas around the fabrication bed (e.g., the walls 132, the platform 131, etc.) may include heating elements to heat the powder in the fabrication bed. Such heaters may be used to preheat unconsolidated material, as discussed above, prior to consolidation via the laser.

Once a layer has been successfully formed, the fabrication platform 131 may be lowered a predetermined distance by a motion system (not pictured in FIG. 1). Once the fabrication platform 131 has been lowered, the material deposition mechanism 125 may be moved across the fabrication bed 130, spreading a fresh layer of material across the fabrication bed 130 to be consolidated as described above. Mechanisms configured to apply a consistent layer of material onto the fabrication bed may include the use of wipers, rollers, blades, and/or other levelling mechanisms for moving material from a source of fresh material to a target location.

Since material in the powder bed 130 is typically only consolidated in certain locations by the laser, some material will generally remain within the bed in an unconsolidated state. This unconsolidated material is sometimes referred to as a "part cake." In some embodiments, the part cake may be used to physically support features such as overhangs and thin walls during the formation process, allowing for SLS systems to avoid the use of temporary mechanical support structures, such as may be used in other additive manufacturing techniques such as stereolithography. In addition, this may further allow parts with more complicated geometries, such as moveable joints or other isolated features, to be printed with interlocking but unconnected components.

The above-described process of producing a fresh layer of powder and consolidating material using the laser repeats to form an object layer-by-layer until the entire object has been fabricated. Once the object has been fully fabricated, the object and the part cake may be cooled at a controlled rate so as to limit issues that may arise with fast cooling, such as warping or other distortion due to variable rate cooling. The object and part cake may be cooled while within the selective laser sintering apparatus, or removed from the apparatus after fabrication to continue cooling. Once fully cooled, the object can be separated from the part cake by a variety of methods. The unused material in the part cake may optionally be recycled for use in subsequent fabrication.

As discussed above, it is highly desirable in a system such as system 100 shown in FIG. 1 to wait for unconsolidated material that is delivered onto the fabrication bed to reach a consistent temperature before consolidating the material with the laser. This waiting period, which is performed for each layer of the object being fabricated, increases the time needed to fabricate the object.

Figure 2:
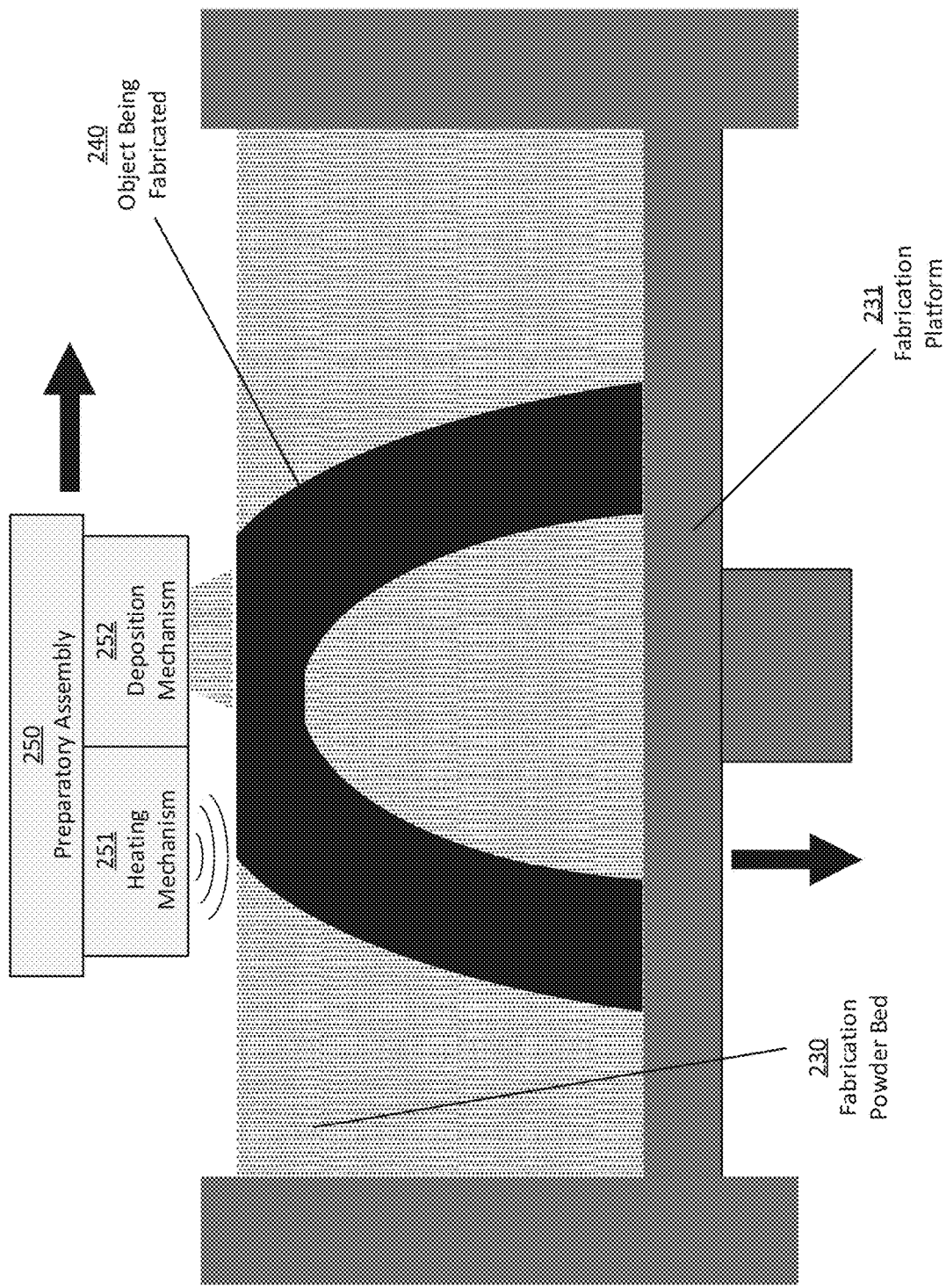
FIG. 2 depicts an illustrative selective laser sintering device in which heating and material deposition mechanisms are combined, according to some embodiments.

FIG. 2 depicts an illustrative selective laser sintering device in which heating and material deposition mechanisms are combined, according to some embodiments. In illustrative system 200 shown in FIG. 2, the laser or scanning system is omitted for clarity, however such a system could include these or another suitable energy source for consolidating preheated source material.

In the example of FIG. 2, a preparatory assembly 250 is configured to move over the fabrication bed 230 and includes a heating mechanism 251 and a deposition mechanism 252. As the preparatory assembly 250 moves, the deposition mechanism deposits unconsolidated material onto the fabrication bed, while the heating mechanism follows the deposition mechanism and heats the just-deposited material. As a result, heating and depositing of material are performed closer together in time and heat is applied more directly to unconsolidated material compared to conventional systems that employ preheating (e.g., compared to the system 100 shown in FIG. 1).

According to some embodiments, heating mechanism 251 may include any electrically driven heating element or elements, including but not limited to one or more quartz tube heaters, ceramic heaters, heating coils, polymer PTC heaters, metal heaters (e.g., Nichrome, resistance wire, etched foil), or combinations thereof. The additive fabrication device 200 may include a controller configured to drive the heating mechanism to produce a desired amount of heat. While the illustrative example of FIG. 2 shows the heating mechanism 251 trailing the material deposition mechanism 252 (i.e., the heating mechanism is arranged to pass over material subsequent to its deposition), it will be appreciated that the heating mechanism may also be positioned to lead the material deposition mechanism 252 (i.e., the heating mechanism is arranged to pass over already-consolidated material subsequent to unconsolidated material being deposited over it). In some embodiments, heating mechanisms may be placed so as to both lead and trail the material deposition mechanism.

In some embodiments, heating elements other than the heating mechanism 251 may be embedded within, or otherwise thermally coupled to, the material deposition mechanism 252. In some embodiments, such heating elements may be disposed within a levelling mechanism (e.g., a roller) to heat or maintain the levelling mechanism at a desired temperature. The levelling mechanism, such as a roller, may then be placed into contact with the fabrication bed 230, including newly deposited material, in order to increase, or decrease, the temperature of the portion of the fabrication bed contacted by the heated portion of the material deposition mechanism primarily via conductive heating.

In some cases, a heated levelling mechanism may not convey a desired amount of thermal energy into the fabrication bed. For instance, the levelling mechanism may not have sufficient contact with the fabrication bed and/or the levelling mechanism may be heated at a low intensity to avoid clumping and other material changes at the fabrication bed during the application of levelling means. In such cases, it may be advantageous for the deposition mechanism to include more than one levelling mechanism. These levelling mechanisms may be arranged to contact the surface of the fabrication bed in series as the preparatory assembly moves, with each such mechanism being maintained at an elevated temperature with respect to the fabrication bed 230. In some embodiments, the additive fabrication device 200 may include one or more heating elements positioned to convey or direct heat through one or more devices or orifices associated with the material deposition mechanism 252, or so as to maintain one or more components of the material deposition mechanism at a temperature different than the surrounding environment. Such heat may be conducted via conduction or flow of gas or fluid into or through the material deposition mechanism.

In some embodiments, heated gas or fluid may be directed onto the fabrication bed 230 and/or onto material in transit from the material deposition mechanism 252 to the fabrication bed to increase the temperature of the material via convection.

It will be appreciated that the various heating techniques described above, including heating unconsolidated material via the heating mechanism 251 and heating some or all of the deposition mechanism via heating elements positioned within or near to the deposition mechanism, may be employed in any suitable combination so that desired temperatures of unconsolidated material and of the fabrication bed may be achieved.

According to some embodiments, deposition mechanism 252 may include various forms of dispensing mechanisms, including but not limited to hoppers, fluidized powder transport tubing, mechanical augers, or combinations thereof. Such dispensing mechanism may further comprise dosing or other mechanism for regulating the amount of material dispensed through the deposition process, such as mechanical apertures, calibrated augers, rotating paddles, or other means known in the art. In some embodiments, the deposition mechanism may include one or more leveling mechanisms to produce a level layer of material after deposition. Such leveling mechanisms may include one or more wipers, rollers, blades, or combinations thereof.

Figure 3:
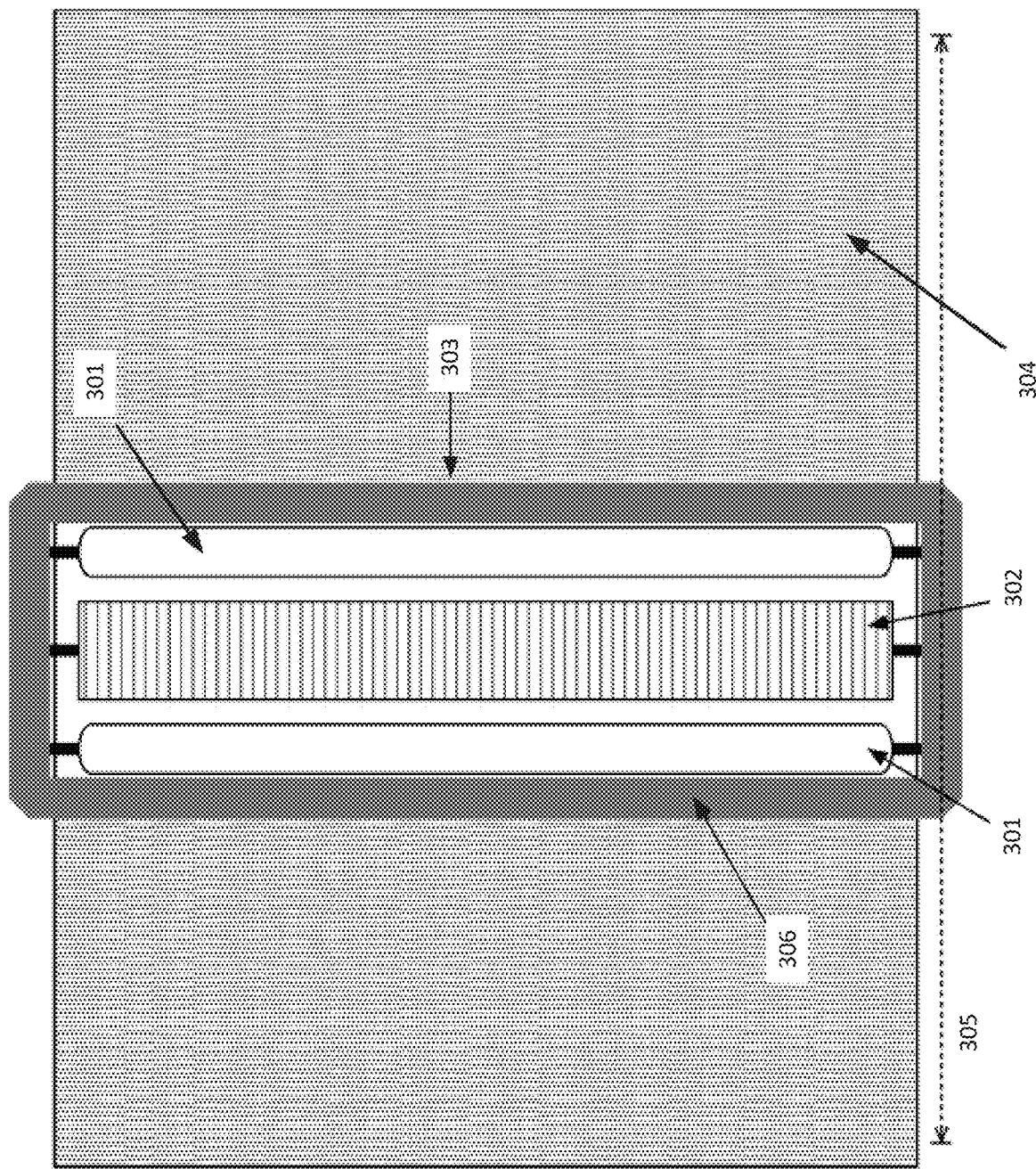
FIG. 3 depicts an illustrative combined heating and material deposition assembly, according to some embodiments.

FIG. 3 depicts an illustrative combined heating and material deposition assembly, according to some embodiments. Illustrative assembly 303 includes heating elements 301 positioned either side of a material deposition mechanism 302 within a frame 306. The view shown in FIG. 3 is positioned to face down onto fabrication bed 304. The frame 306 is configured to move across the fabrication bed 304 along axis 305, so that some or all of the heating elements 301 pass over areas of the fabrication bed 304 at the same time as, or shortly after, the passage of the material deposition mechanism 302 due to the combined motion of the preparatory assembly 303.

In the example of FIG. 3, combined motion of the heating elements 301 and material deposition mechanism 302 is achieved by mechanically mounting or coupling the heating elements to the material deposition mechanism by attaching each to frame 306. It will be appreciated that the heating elements 301 and material deposition mechanism 302 could, in other embodiments, be coupled to separate frames and moved independently over the fabrication bed.

In some embodiments, heating elements 301 may be mounted to the frame 306 such that a lower surface of the heating element moves parallel to the topmost surface of the fabrication bed 304, including any newly deposited material, at a predefined separation distance. In general, it may be advantageous to minimize such separation distances, in order to optimize the efficiency of heat application. Too close a proximity to the fabrication bed may increase the risk of particulates or other material from the fabrication bed coating, contaminating, or otherwise interfering with the heating element. Moreover, proximity to the fabrication bed may increase the degree to which non-uniformities in the heating element's production of heat result in non-uniformities in heating the fabrication bed. In some embodiments, the inventors have found separation distances between a heat element and the fabrication bed in the range of 0.1 mm-50 mm to be acceptable, with further optimization by routine testing of specific material types and heat sources. In some embodiments, one or more shrouds (not shown) may be added to the frame (or otherwise positioned around either or both heating elements) to direct thermal energy from the heating elements towards the powder surface, rather than to other areas or components of the device.

Figure 4:
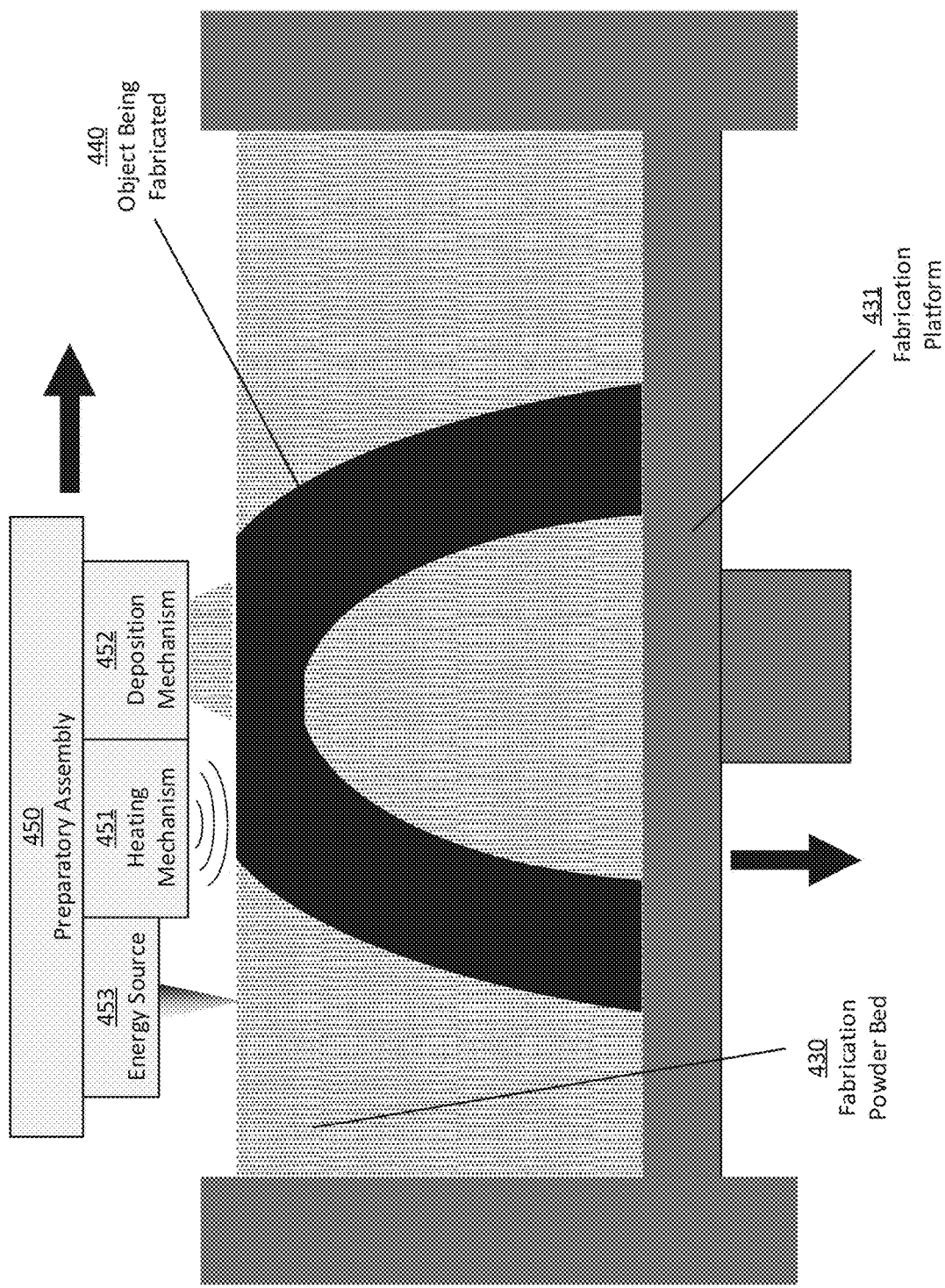
FIG. 4 depicts an illustrative selective laser sintering device in which heating and material deposition mechanisms are combined with an energy source, according to some embodiments.

FIG. 4 depicts an illustrative selective laser sintering device in which heating and material deposition mechanisms are combined with an energy source, according to some embodiments. In the example of FIG. 4, a preparatory assembly 450 is configured to move over the fabrication bed 430 and includes a heating mechanism 451, a material deposition mechanism 452, and an energy source 453. As the preparatory assembly 450 moves, the material deposition mechanism 452 deposits unconsolidated material onto the fabrication bed, while the heating mechanism follows the deposition mechanism and heats the just-deposited material. Furthermore, the unconsolidated preheated material is then consolidated by energy source 453. As a result, heating and depositing of material are performed closer together in time and heat is applied more directly to unconsolidated material compared to conventional systems that employ preheating (e.g., compared to the system 100 shown in FIG. 1). In addition, consolidation can occur a very short time after preheating due to the physical proximity of the heating mechanism 451 and the energy source 453.

Heating mechanism 451 and deposition mechanism 452 may be configured in any of the numerous ways described above with respect to heating mechanism 251 and deposition mechanism 252 shown in FIG. 2. In some embodiments, energy source 453 may include a laser and scanning system and direct laser light onto the fabrication bed via the energy source. It will be appreciated that the energy source 453 may not necessary be the ultimate source of the energy so long as the energy from an initial source can be directed to the preparatory assembly to be directed onto the fabrication bed. For instance, energy source 453 may comprise a lens and/or an optical fiber mounted to the preparatory assembly 450 that is coupled to a laser source that is not mounted to the preparatory assembly but that can be operated to direct light to the lens and/or optical fiber.

In the example of FIG. 4, the preparatory assembly is configured to move from across the fabrication bed, which results in a necessary stop at the exterior of the bed once the preparatory assembly reaches an edge of the bed. As discussed above, one approach to eliminate such stoppages is to rotate a preparatory assembly about an axis, thereby continually moving a deposition mechanism, heating mechanism and energy source.

Figure 5A:
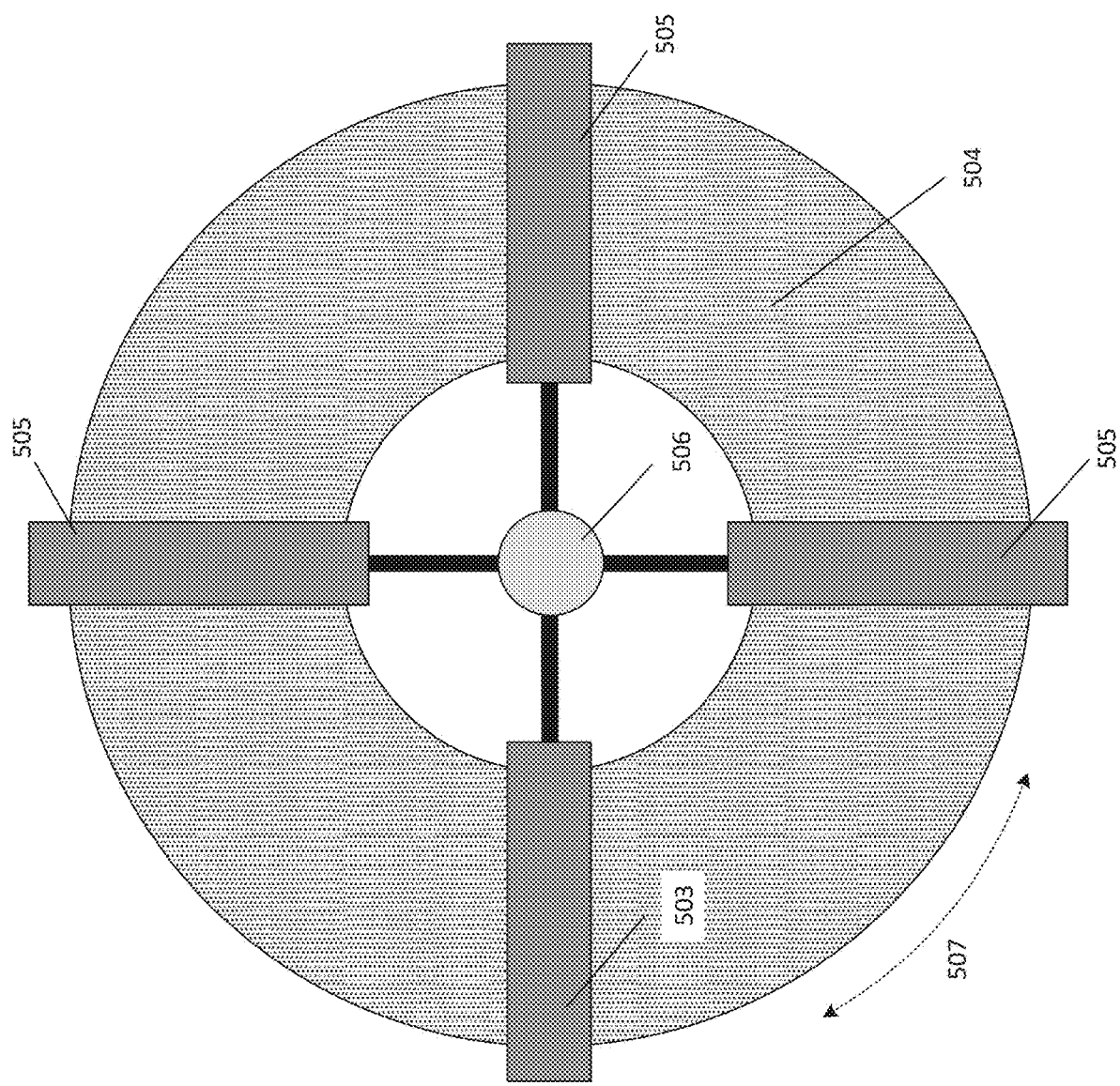
FIG. 5A depicts an overhead view of a rotational assembly, according to some embodiments.
Figure 5B:
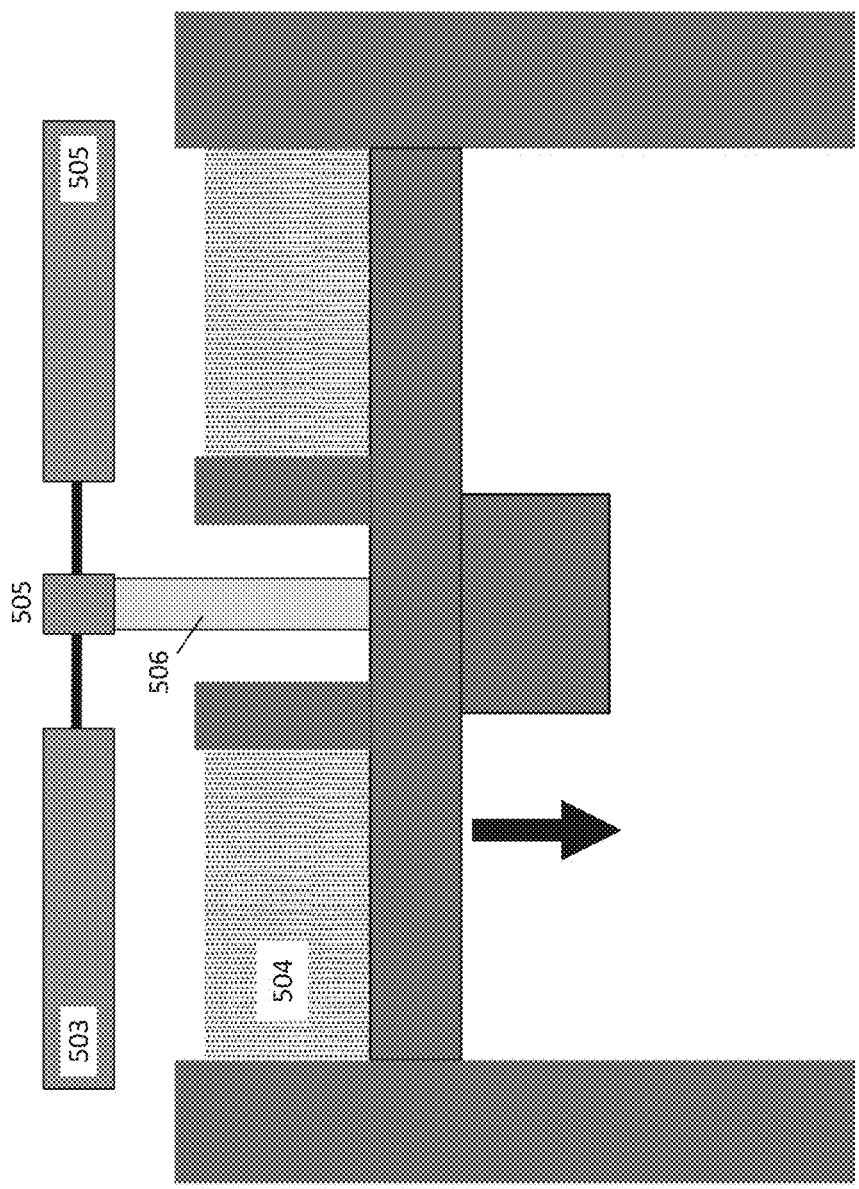
FIG. 5B depicts the rotational assembly of FIG. 5A within an illustrative selective laser sintering device, according to some embodiments.

FIG. 5A depicts an overhead view of one such illustrative rotational assembly, according to some embodiments. In the example of FIG. 5A, a preparatory system is illustrated that comprises radial arms 503 and 505 and axis 506. This system may be configured to rotate in a direction 507 about the axis 506 at the center of an annular (or circular) fabrication bed 504. Alternatively, the fabrication bed 504 itself may be rotated in direction 507 about the axis 506 such that portions of the rotary fabrication bed 504 pass under the preparatory system. In either case, the fabrication bed and preparatory system may be continuously moved relative to one another. As a result, simultaneous recoating, preheating, and exposure of a fabrication bed may be performed, thereby reducing delays for repositioning or inactive transit of the preparatory system. FIG. 5B depicts a cross sectional view of the rotational assembly of FIG. 5A within an illustrative selective laser sintering device, according to some embodiments.

Upon completion of exposure of a given layer of the fabrication bed 504, the fabrication platform may be lowered, or preparatory system raised, to allow for the deposition of fresh unconsolidated material on the fabrication bed. Alternatively, the fabrication platform may be lowered at a gradual rate, or in stages during the fabrication process. In particular, it may be advantageous to include additional radial structures 505 of the preparatory system, particularly when such systems further include means of independently delivering focused energy to the fabrication bed 507. In such cases, production of parts may be accelerated by having more than one radial arm simultaneously operate on different sections of the fabrication bed 504. As portions of the fabrication bed 504 pass below each portion of the preparatory system, said system may distribute new material, level said material, and/or preheat such material using included heating elements. And, when combined with a source of focused energy, said preparatory system may further expose new material to focused energy, causing consolidation, sintering, or other desirable material changes. The ability to conduct such processes in parallel may advantageously allow for the production of multiple separate objects simultaneously, for the production of multiple portions of the same object simultaneously, or for more complicated multiple step processing of the same portion of an object.

According to some embodiments, each of the illustrative portions 503 and 505 of the preparatory system may each include one or more heating elements, material deposition mechanisms and/or energy sources. In some embodiments, it may be beneficial to perform only some of the material deposition, preheating and consolidation acts with a given radial arm of the preparatory system. For instance, in the example of FIG. 5A, adjacent pairs of radial arms may include, in a first case, a material deposition and leveling mechanism in addition to a heating element, and in a second case, an energy source only. As a result, when in motion, the same point on the fabrication bed may have material deposited, leveled and preheated when a first radial arm passes the point, and then undergo consolidation when the subsequent radial arm passes this point.

FIG. 6A-B depict two different views of an assembly that combines infrared sensors with a heating array, according to some embodiments. As shown in the example of FIGS. 6A-B, a preparatory mechanism (not shown) may include one or more infrared sensors 608 arrayed across the width of the preparatory mechanism with a given spacing. Such sensors 608 may be arranged between a plurality of heating elements 609 and a levelling device 602.

As discussed above, it may be beneficial to sense the temperature of a fabrication bed and determine how to most effectively apply heat via heating element(s) based on the sensed temperature. Said determination may comprise operating one or more heating elements for a selected length of time and/or at a selected temperature based on the sensed temperature. In the example of FIGS. 6A-B, according to some embodiments, each of the heating elements may be independently operated based on a temperature sensed by respective adjacent sensors. In this manner, the heating elements in the array 609 may, in some embodiments, be operated at different temperatures and/or for different lengths of time.

Any suitable control scheme may be employed to operate heating elements 609 based on temperatures sensed by the sensors 608. In some embodiments, an "open loop" control scheme may be appropriate based upon calculated or measured thermal characteristics of the larger system, so as to maintain a consistent and appropriate temperature for sintering at the fabrication bed. In some embodiments, various types of "closed loop" control systems, such as PID control of heating elements, may be utilized based upon one or more sensors positioned within the heating elements, material deposition mechanism, or other location.

In some embodiments, temperature sensing separate from the temperature sensors 608 may be additionally or alternatively performed via thermal imaging or other non-contact thermal sensing means of the fabrication bed itself. In general, the application of heat from sources immediately proximate to the fabrication bed may allow for significantly more efficient heating of material reducing both the peak and total power consumption of the device and also any unwanted secondary heating to other components of the device. Moreover, by applying heat more directly to the material, additional control over material temperature may be achieved, avoiding excess temperature exposure and subsequent unwanted changes to the material. In addition, while the embodiments described above have generally applied heat uniformly over the fabrication bed 704, some embodiments of the present invention may include multiple heaters 709 or heating zones in order to provide more fine grained control over various regions of the fabrication bed 704. Such variable application of heat may be provided as a result of differences in starting temperature across the fabrication bed 704, such as may be determined via non-contact thermal sensing of sufficient resolution, such as thermal imaging.

In some embodiments, application of different amounts of heat (and/or application of heat for different lengths of time) may be determined based upon patterns of prior exposure and heating or upon planned exposures and heating. As one example, previously sintered material may provide thermal energy to newly deposited material, such as discussed in U.S. Provisional Patent Application No. 62/545,231, filed on Aug. 14, 2017, incorporated herein by reference. Accordingly less thermal energy may be applied onto newly distributed material overlaying previously sintered material. Alternatively, more thermal energy may be applied to material not overlaying such sintered material. In some embodiments, thermal energy may further be restricted to those portions of the fabrication bed expected to be sintered in the current or subsequent process steps. As one example, fabrication processes only exposing the center region of a larger fabrication bed may benefit from the application of heat to said center region and a sufficient margin distance.

According to some embodiments, it may be advantageous to arrange the heating elements 609 such that the sensors 608 pass over a given area of the fabrication bed 604 in advance of the heating elements 609, in order to determine the appropriate degree of heating based upon the sensed heat. In some embodiments, such as described above in relation to FIG. 3 in the context of two rows of heaters, it may be advantageous to include multiple rows of sensors 608 such that the preparatory mechanism may be operated in more than one direction. In other embodiments, it may also be advantageous to have multiple rows of sensors 608 to increase the effective resolution or accuracy of measurements of temperatures from the fabrication bed 604. Alternatively, multiple rows of sensors 608 may allow for measurement of temperature both prior to and following exposure of the fabrication bed 604, thus allowing for improved calibration or detection of conditions requiring corrective steps such as additional passes, delay periods, or process suspension.

In some embodiments, the spacing between each of the infrared sensors 608 may be chosen at least in part based upon the field of view of the infrared sensor 608, such that each infrared sensor 608 measures the infrared emissions of a separate area of the fabrication bed 604. As will be appreciated, infrared sensors 608 may then be used to measure fabrication bed 604 temperature with an approximate resolution of said spacing in one direction and arbitrary resolution in the direction of motion of the preparatory mechanism. In other embodiments, however, such infrared sensors 608 may be spaced so as to cause a desired degree of overlap of fields of view. In some embodiments, the number and spacing of infrared sensors 608 may be the same as the number as spacing of heaters 609. To the extent that a heater 609 has a greater field width in its thermal emissions than the infrared sensor 608 has field of view, however, it may be advantageous to have a reduced number of heaters 609.

Various alterations, modifications, and improvements are intended to be part of this disclosure and within the spirit and scope of the invention. As one example, although embodiments disclosed herein above may be disclosed in terms of a moving preparatory mechanism and a stationary fabrication bed, it should be understood that the essential characteristic of such motion is relative and not absolute, and thus that other embodiments may be arranged such that the fabrication bed is instead moved while the preparatory is stationary, or further that both components may be motion with an effective relative motion with respect to one another. Further, while embodiments discussed above may be discussed in connection with the use of heat, it should be understood that maintaining a desired temperature in material may also include the use of cooling elements, or elements capable of both heating and cooling, such as, for example, the use of one or more Peltier junctions within a levelling means.

Although the embodiments discussed herein may relate to selective sintering technology, it should be understood that other embodiments within the scope of the invention may be advantageous in other processes, such as high-speed sintering, inhibition sintering, three-dimensional printing, multi-jet modelling, or multi-jet fusion modeling. In some such embodiments, for example, a second liquid material may be added to newly deposited first material in order to modify various characteristics of said first material, including cohesiveness, color, or the degree and temperature at which said material must reach to consolidate or otherwise transform in a subsequent step. In these embodiments, one or more means for the delivery of a second material, such as a liquid or powdered substance, may be provided for in connection with the preparatory mechanism. As one example, one or more nozzles or orifices, such as inkjet-type dispensers, may be located across the width of the preparatory mechanism. On other instances, such dispensers may be mounted onto one or more heads capable of reciprocal motion along the width of the preparatory mechanism. In such cases, it may be advantageous to position heating elements, such as described above, so that heat is applied to the fabrication bed following deposition so as to modify the temperature of second material or otherwise induce a temperature-related change of state, such as evaporation of a solvent. Alternatively, it may be advantageous to preheat the first material, as discussed above, prior to the addition of the second material. Other modifications and methods of manufacturing will be obvious to those skilled in the art. Such modifications are intended to be part of this disclosure, and are intended to be within the scope of the invention.

Figure 7:
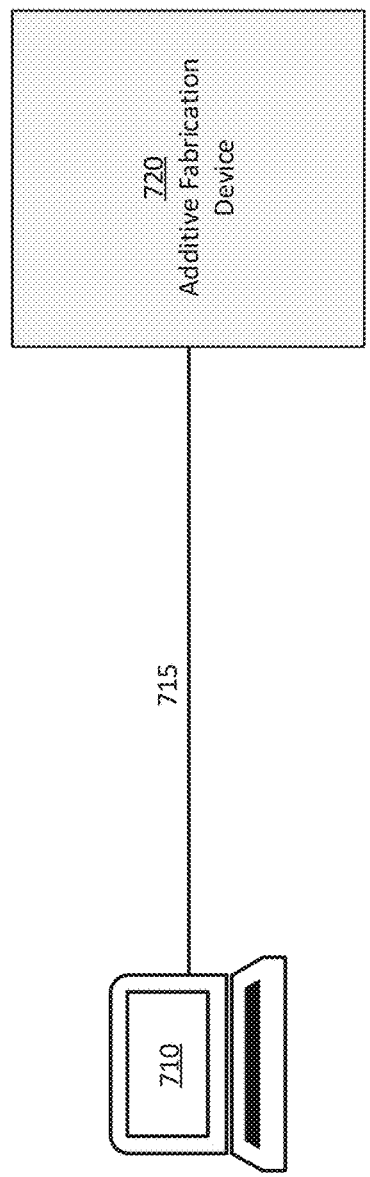
FIG. 7 is a block diagram of a system suitable for practicing aspects of the invention, according to some embodiments.

FIG. 7 is a block diagram of a system suitable for practicing aspects of the invention, according to some embodiments. System 700 illustrates a system suitable for generating instructions to perform additive fabrication by a device utilizing a combined material deposition mechanism and heating mechanism, and subsequent operation of the additive fabrication device to fabricate an object. For instance, instructions to fabricate the object using an additive fabrication device, such as device 200 shown in FIG. 2 or device 400 shown in FIG. 4, may comprise instructions to operate a heating mechanism in concert with a deposition mechanism. In some cases, the instructions may also, when executed by the additive fabrication device, cause the additive fabrication device to operate an energy source in concert with the heating mechanism and deposition mechanism.

According to some embodiments, computer system 710 may execute software that generates two-dimensional layers that may each comprise sections of the object. Instructions may then be generated from this layer data to be provided to an additive fabrication device, such as additive fabrication device 720, that, when executed by the device, fabricates the layers and thereby fabricates the object. Such instructions may be communicated via link 715, which may comprise any suitable wired and/or wireless communications connection. In some embodiments, a single housing holds the computing device 710 and additive fabrication device 720 such that the link 715 is an internal link connecting two modules within the housing of system 700.

Figure 8:
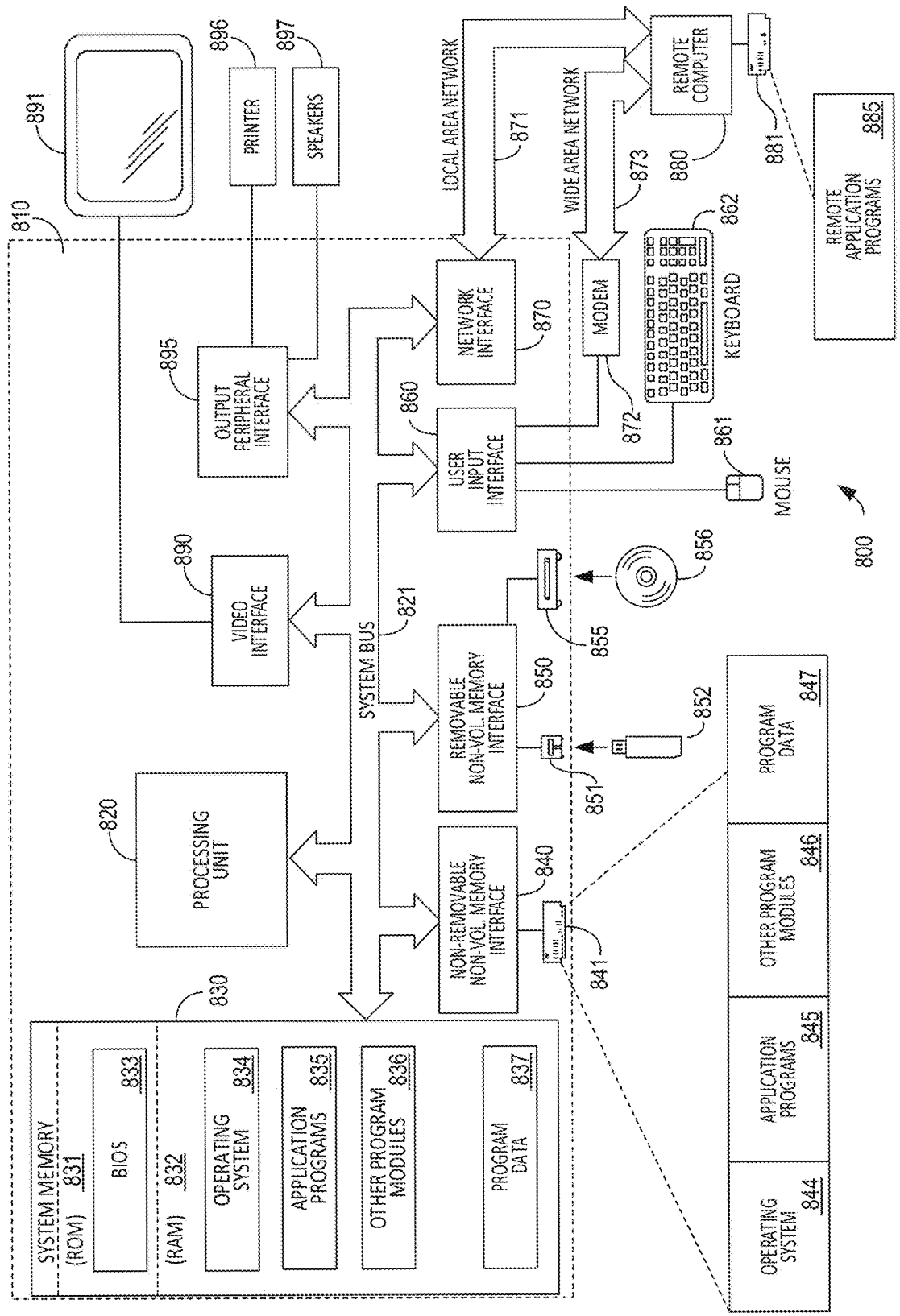
FIG. 8 illustrates an example of a computing system environment on which aspects of the invention may be implemented.

FIG. 8 illustrates an example of a suitable computing system environment 800 on which the technology described herein may be implemented. For example, computing environment 800 may form some or all of the computer system 710 shown in FIG. 7. The computing system environment 800 is only one example of a suitable computing environment and is not intended to suggest any limitation as to the scope of use or functionality of the technology described herein. Neither should the computing environment 800 be interpreted as having any dependency or requirement relating to any one or combination of components illustrated in the exemplary operating environment 800.

The technology described herein is operational with numerous other general purpose or special purpose computing system environments or configurations. Examples of well-known computing systems, environments, and/or configurations that may be suitable for use with the technology described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The technology described herein may also be practiced in distributed computing environments where tasks are performed by remote processing devices that are linked through a communications network. In a distributed computing environment, program modules may be located in both local and remote computer storage media including memory storage devices.

With reference to FIG. 8, an exemplary system for implementing the technology described herein includes a general purpose computing device in the form of a computer 810. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 810. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable, volatile/nonvolatile computer storage media. By way of example only, FIG. 8 illustrates a hard disk drive 841 that reads from or writes to non-removable, nonvolatile magnetic media, a flash drive 851 that reads from or writes to a removable, nonvolatile memory 852 such as flash memory, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies. A user may enter commands and information into the computer 810 through input devices such as a keyboard 862 and pointing device 861, commonly referred to as a mouse, trackball or touch pad. Other input devices (not shown) may include a microphone, joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 8. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on memory device 881. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. However, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a non-transitory computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software," when used herein, are used in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. An additive fabrication device configured to produce three-dimensional objects by sintering a source material within a fabrication bed, the device comprising:
    the fabrication bed;
    an assembly configured to move laterally across a surface of the fabrication bed;
    a material deposition mechanism coupled to the assembly such that the material deposition mechanism moves with the assembly as the assembly moves across the surface of the fabrication bed, and configured to deposit source material on the fabrication bed as the assembly moves laterally across the surface of the fabrication bed;
    a first heater coupled to the assembly such that the first heater moves with the assembly as the assembly moves across the surface of the fabrication bed, and facing the fabrication bed;
    a second heater coupled to the assembly such that the second heater moves with the assembly as the assembly moves across the surface of the fabrication bed, and facing the fabrication bed,
    wherein the material deposition mechanism is arranged between the first and second heaters,
        wherein the first heater is configured to, as the assembly moves laterally across the surface of the fabrication bed in a first direction, direct heat onto the source material that is deposited onto the fabrication bed by the material deposition mechanism, and
        wherein the second heater is configured to, as the assembly moves laterally across the surface of the fabrication bed in a second direction, direct heat onto the source material that is deposited onto the fabrication bed by the material deposition mechanism; and
    an energy source configured to be directed onto the source material that is deposited onto the fabrication bed and heated by the first heater and/or the second heater, to cause sintering of the source material that is deposited onto the fabricated bed and heated by the first heater and/or the second heater.

2. The additive fabrication device of claim 1, further comprising a temperature sensor arranged to sense a temperature of the source material deposited by the material deposition mechanism.

3. The additive fabrication device of claim 2, wherein the temperature sensor is coupled to the assembly.

4. The additive fabrication device of claim 2, wherein the first heater and/or the second heater are configured to operate at a temperature based at least in part on the temperature of the source material sensed by the temperature sensor.

5. The additive fabrication device of claim 1, wherein the energy source is coupled to the assembly.

6. The additive fabrication device of claim 1, wherein the first heater or the second heater is a tube heater.

* * * * *